United States Patent Office 3,251,846
Patented May 17, 1966

3,251,846
N-(D-1,6-DIMETHYLISOERGOLENYL-8)-
N',N'-DIALKYLUREAS
Miroslav Semonský, Viktor Zikán, and Zdeněk Votava, Prague, Czechoslovakia, assignors to Spofa, Sdružení podniků pro zdravotnickou výrobu, Prague, Czechoslovakia
No Drawing. Filed Sept. 5, 1963, Ser. No. 306,671
Claims priority, application Czechoslovakia,
Sept. 5, 1962, 5,128/62
5 Claims. (Cl. 260—285.5)

The invention relates to new N-(D-1,6-dimethylisoergolenyl-8)-N',N'-dialkylureas of general Formula I:

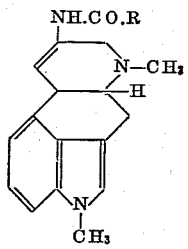

wherein R signifies the —N($C_2H_5$)$_2$ or —N($CH_3$)$_2$ group, as well as to acid salts thereof, and to the method of preparing the same.

These new compounds exhibit a significant antiserotonin activity; compared with the corresponding ureas which are not substituted in the $N_{(1)}$-position, they are less toxic.

The N-(D-1,6-dimethylisoergolenyl-8)-N',N'-dialkylureas of the general Formula I are new compounds not yet reported in the literature, which were prepared in the framework of the study in the relations between chemical constitution and pharmacological activity.

According to the invention, these compounds are prepared by methylating the corresponding N-(D-6-methylisoergolenyl-8)-N',N'-dialkylureas, preferably by means of methyl iodide, in liquid ammonia, and in the presence of potassium amide. They are isolated by evaporating the ammonia, and the crude products are purified by adsorption chromatography and crystallization.

The ureas obtained by the method according to the invention, and having the general Formula I, form easily crystallizable salts with organic and inorganic acids, e.g. the acid maleate, which are readily soluble in water.

The ureas of the general Formula I, as well as additonal compounds of this group, exhibit characteristic color reactions, e.g. the Keller van Urk reactions, which can be used for differentiating them from ureas not substituted at $N_{(1)}$. The difference is especially significant in the case of the von Urk reaction (the unsubstituted ureas give deep-blue colour, while the corresponding $N_{(1)}$-methyl derivatives give tobacco-brown colour rapidly turning to a grey-violet color.

The N-(D-6-methylisoergolenyl-8)-N',N'-dialkyl ureas serving as starting material for the preparation of the corresponding $N_{(1)}$-methyl derivatives can be easily obtained from the D-isolysergic hydrazide via the azide and (D-6-methylisoergolenyl-8)-isocyanate (V. Zikán, M. Semonský: Collection Czechoslov. Chem. Communs. 25, 1955-1960).

Examples (1) N-(D-1,6-dimethylisoergolenyl-8) - N',N' - diethyl urea.

Ferric nitrate was added to a solution of 270 mg. potassium in 350 ml. anhydrous liquid ammonia, amount of ferric nitrate being just sufficient just necessary to decolorize the liquid, and after addition of 2.0 g. finely powdered N-(D-6-methylisoergolenyl-8) - N',N' - diethyl urea the mixture was stirred vigorously until the compound was dissolved (about 25 min). To the solution thus obtained a solution of 1.2 g. methyl iodide in 15 ml. dry ether was added, and the mixture stirred for an additional 30 min. After evaporating the ammonia, the residue was dissolved in 150 ml. chloroform, the solution washed with water, dried and evaporated. The crude product was purified by chromatography on a column of 100 g. alumina (activity IV). The course of the chromatography was followed by paper chromatography using formamide with 5% of ammonium formate as the stationary phase, and a mixture of benzene and chloroform as the mobile phase. The elution of the column was carried out by means of a mixture of benzene and chloroform (1:2). The combined fractions containing the product were evaporated and the residue purified by crystallization.

The N-(D-1,6-dimethylisoergolenyl-8) - N',N' - diethyl urea forms prisms melting at 120–125° C. (benzene); $(\alpha)_D^{20}=+319°$ (c=0.5, pyridine); the acid maleate prisms melting at 165–167° C. (ether-ethanol).

(2) N - (D - 1,6 - dimethylisoergolenyl - 8)-N',N'-dimethyl urea.

The compound was prepared from N-(D-6-methylisoergolenyl-8)-N',N'-dimethylurea in the same way as described in Example 1. This compound forms prismatic crystals with M.P. 115–116° C. (acetone); $(\alpha)_D^{20}=+335°$ (c=0.5, pyridine); the acid maleate prisms melting at 172–173° C. (ethanol).

What we claim is:
1. The compound N - (D - 1,6-dimethylisoergolenyl-8)-diethyl urea with M.P. 120–125° C. $(\alpha)_D^{20}=+319°$ (c=0.5, pyridine), and its acid maleate with M.P. 165–167° C.
2. The compound N-(D-1,6-dimethylisoergolenyl-8)-dimethyl urea with M.P. 115–116° C. $(\alpha)_D^{20}=+335°$ (c=0.5, pyridine), and its acid maleate with M.P. 172–173° C.
3. A compound selected from the group consisting of compounds of the formula:

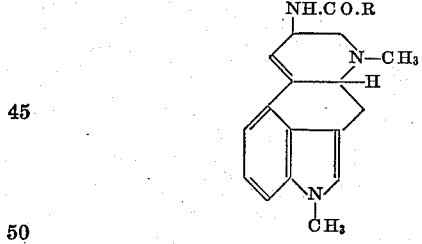

wherein R is —N(lower alkyl)$_2$; and non-toxic acid addition salts thereof.
4. N-(D-1,6-dimethylisoergolenyl-8)-diethyl urea-acid maleate.
5. N - (D - 1,6-dimethylisoergolenyl-8)-dimethyl urea-acid maleate.

References Cited by the Examiner

FOREIGN PATENTS
811,964  4/1959  Great Britain.

OTHER REFERENCES

Chem. Abst., vol. 54, columns 24824–30 (1960), (abstracting Zi Kan and Semonsky (1), Collection C Zech. Chem. Communs, vol. 25, pp. 1922–8 (1960)).

Chem. Abst., vol. 59, col. 7581–2 (1963), (Abstracting Zi Kan and Semonsky (2) Collection (Zech Chem. Communs, vol. 28, pages 180–3 (1963)).

HENRY R. JILES, Acting Primary Examiner.

DONALD G. DAUS, Assistant Examiner.